United States Patent
Hagstrand et al.

(10) Patent No.: US 10,679,769 B2
(45) Date of Patent: *Jun. 9, 2020

(54) CABLE WITH IMPROVED ELECTRICAL PROPERTIES

(71) Applicant: BOREALIS AG, Vienna (AT)

(72) Inventors: Per-Ola Hagstrand, Stenungsund (SE); Thomas Gkourmpis, Göteborg (SE); Antonios Gitsas, Linz (AT); Villgot Englund, Göteborg (SE); Ulf Nilsson, Odsmal (SE); Mattias Andersson, Göteborg (SE); Jonna Hynynen, Göteborg (SE); Christian Müller, Göteborg (SE)

(73) Assignee: BOREALIS AG, Vienna (AT)

(*) Notice: Subject to any disclaimer, the term of this patent is extended or adjusted under 35 U.S.C. 154(b) by 0 days.

This patent is subject to a terminal disclaimer.

(21) Appl. No.: 16/312,400

(22) PCT Filed: Jun. 20, 2017

(86) PCT No.: PCT/EP2017/065139
§ 371 (c)(1),
(2) Date: Dec. 21, 2018

(87) PCT Pub. No.: WO2017/220613
PCT Pub. Date: Dec. 28, 2017

(65) Prior Publication Data
US 2019/0206588 A1    Jul. 4, 2019

(30) Foreign Application Priority Data
Jun. 21, 2016   (EP) ..................................... 16175587

(51) Int. Cl.
*H01B 9/02*    (2006.01)
*H01B 3/44*    (2006.01)
*C08L 23/06*   (2006.01)
*C08L 23/08*   (2006.01)
*H01B 13/14*   (2006.01)

(52) U.S. Cl.
CPC ............. *H01B 3/441* (2013.01); *C08L 23/06* (2013.01); *C08L 23/08* (2013.01); *C08L 23/083* (2013.01); *H01B 9/027* (2013.01); *H01B 13/14* (2013.01); *C08L 2205/02* (2013.01); *C08L 2205/025* (2013.01); *C08L 2207/062* (2013.01); *C08L 2207/066* (2013.01); *C08L 2312/00* (2013.01)

(58) Field of Classification Search
CPC ....................................................... H01B 9/027
USPC ..................................... 174/102 SC, 120 SC
See application file for complete search history.

(56) References Cited

U.S. PATENT DOCUMENTS 10,208,196 B2 * 2/2019 Nilsson .................. C08L 23/06
2013/0087362 A1 * 4/2013 Nilsson .................. C08L 23/06
                                                          174/105 SC

FOREIGN PATENT DOCUMENTS

| EP | 0129368   |   | 12/1984 |
|----|-----------|---|---------|
| EP | 0260130   |   | 11/1993 |
| EP | 0537130   |   | 9/1996  |
| EP | 0423101   |   | 5/2006  |
| JP | 02018811  | * | 1/1990  |
| WO | 93/08222  |   | 4/1993  |
| WO | 96/13529  |   | 5/1996  |
| WO | 97/28170  |   | 8/1997  |
| WO | 98/46616  |   | 10/1998 |
| WO | 98/49208  |   | 11/1998 |
| WO | 98/56831  |   | 12/1998 |
| WO | 99/12981  |   | 3/1999  |
| WO | 99/19335  |   | 4/1999  |
| WO | 00/34341  |   | 6/2000  |
| WO | 2011/113686 |   | 9/2011 |
| WO | 2012/044523 |   | 4/2012 |
| WO | 2012/150285 |   | 11/2012 |
| WO | 2016/066619 |   | 5/2016 |

OTHER PUBLICATIONS

Hosier, et al., Structure-property relationships in polyethylene blends: the effect of morphology on electrical breakdown strength, Journal of Materials Science 32 (1997) 4523-4531.
International Search report and Written Opinion issued for International Application No. PCT/EP2017/065139, dated Aug. 23, 2017, 13 pages.

* cited by examiner

Primary Examiner — Chau N Nguyen
(74) Attorney, Agent, or Firm — Meunier Carlin & Curfman LLC

(57) ABSTRACT

A cable comprising a conductor surrounded by at least an inner semiconductive layer, an insulation layer and an outer semiconductive layer, in that order, wherein the insulation layer is not crosslinked or is cross-linked and comprises at least 90 wt % of a polymer composition, said polymer composition comprising: (I) 95.5 to 99.9 wt % of an LDPE; and (II) 0.1 to 4.5 wt % of an HDPE having a density of at least 940 kg/m$^3$.

17 Claims, No Drawings

CABLE WITH IMPROVED ELECTRICAL PROPERTIES

This invention relates to the use of blends comprising low density polyethylene (LDPE) polymers in the insulation layers of cables, such as DC cables. In particular, the invention relates to the combination of LDPEs with low amounts of a secondary HDPE polymer in order to surprisingly enable the formation of cable insulation layers with remarkably low conductivity.

The blends of the invention can be used in cross-linked or non-cross-linked form, in the latter case avoiding the need for a crosslinking agent to be present and avoiding the need for a post crosslinking degassing procedure to remove crosslinking agent by-products.

Whether cross-linked or non-cross-linked, the conductivity of the resulting composition and hence the conductivity of the insulation layer is lower than the use of the corresponding LDPE alone despite very low levels of HDPE being employed.

BACKGROUND

Polyolefins produced in a high pressure (HP) process are widely used in demanding polymer applications where the polymers must meet high mechanical and/or electrical requirements. For instance in power cable applications, particularly in medium voltage (MV) and especially in high voltage (HV) and extra high voltage (EHV) cable applications, the electrical properties of the polymer composition used in the cable has significant importance. Furthermore, the electrical properties of importance may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order. The cables are commonly produced by extruding the layers on a conductor.

The polymer material in one or more of said layers is often cross-linked to improve e.g. heat and deformation resistance, creep properties, mechanical strength, chemical resistance and abrasion resistance. During the crosslinking reaction, crosslinks (bridges) are primarily formed. Crosslinking can be effected using e.g. a free radical generating compound which are typically incorporated into the layer material prior to the extrusion of the layer(s) on a conductor. After formation of the layered cable, the cable is then subjected to a crosslinking step to initiate the radical formation and thereby crosslinking reaction.

Peroxides are very commonly used as free radical generating compounds. The resulting decomposition products of peroxides may include volatile by-products which are often undesired, since e.g. may have a negative influence on the electrical properties of the cable. Therefore the volatile decomposition products such as methane are conventionally reduced to a minimum or removed after crosslinking and cooling step. Such removal step, generally known as a degassing step, is time and energy consuming causing extra costs. It will be appreciated that a cross-linked polyethylene material is thermosetting.

LDPE is also an ideal cable forming material from a cleanliness point of view. LDPE can be manufactured in very pure form without impurities. In contrast low pressure polymers often contain more gels and catalyst residues which can lead to defects in the cable.

In order to increase the power transmission capability of extruded high voltage direct current (HVDC) cables, the voltage needs to be increased. In HVDC cables, the insulation is heated by the leakage current. The heating is proportional to the insulation conductivity×voltage$^2$. Thus, if the voltage is increased, more heat will be generated. This may lead to thermal runaway followed by electric breakdown. Thus, in order to increase the power transmission capacity, insulation material with very low electrical conductivity is needed. In one embodiment, the voltage may be increased from today's highest level of 320 kV to 640 kV or more.

The present inventors have now investigated the possibility of reducing conductivity though combination of the LDPE with a secondary polymer. The secondary polymer however is typically one made using an olefin polymerisation catalyst and hence catalyst residue content might be high. This leads to a greater risk of mechanical breakdown compared to pure XLPE. Nevertheless, the inventors have surprisingly found that the combination of low amounts of HDPE and LDPE leads to remarkable conductivity reduction in thermoplastic and cross-linked insulation layers even at very low levels of HDPE.

Thermoplastic LDPE offers several advantages as cable insulation compared to a thermosetting cross-linked PE. As the polymer is not cross-linked, there is no possibility of peroxide initiated scorch. In addition, no degassing step is required to remove peroxide decomposition products. The elimination of crosslinking and degassing steps can lead to faster, less complicated and more cost effective cable production. However, the absence of a cross-linked material can lead to a reduced temperature resistance and hence significant problems with creep. Thus, better thermomechanical properties are needed in order to provide a polymer material that can be used without crosslinking in a cable insulation layer.

The present inventors have now found that the combination of an LDPE with a low amount of an HDPE can provide a blend such as a thermoplastic blend which is ideally suited for cable manufacture. Surprisingly, these blends have much lower conductivity than the corresponding LDPE alone and do not suffer from dielectric breakdown. Moreover, as the HDPE content is so low, this leads to a reduced risk of mechanical breakdown caused by the presence of the less pure HDPE with the LDPE.

Moreover, the inventors have found that certain LDPEs can be combined with low amounts of HDPE to form a blend which has remarkably low conductivity in cross-linked form.

The LDPE of use in the invention is not itself new and it has been previously proposed in the literature. Moreover, the possibility of using non cross-linked LDPE in the insulation layer of a cable is not new. In WO2011/113685, LDPE of density 922 kg/m$^3$ and MFR$_2$ 1.90 g/10 min is suggested for use in the insulation layer of a cable. WO2011/113685 also suggests using other polymers individually in the non cross-linked insulation layer of a cable.

In WO2011/113686, a blend of LDPE and HDPE is used to manufacture a cross-linked polymer composition that can be used in the insulation layer of a cable however the amounts of HDPE taught are relatively high (minimum 5 wt %).

In US2013/0175068 there is a disclosure of the use of HDPE and LDPE to improve breakdown strength in thermoplastic cables. 20 wt % HDPE is exemplified in the examples.

The blends of the invention are therefore ideal for use in the insulation layer in a direct current (DC) power cable or AC power cable and the blends enable cables that operate at voltages higher than possible today.

SUMMARY OF INVENTION

Viewed from one aspect the invention provides a cable comprising one or more conductors surrounded by at least an inner semiconductive layer, an insulation layer and an outer semiconductive layer, in that order, wherein the insulation layer is not cross-linked or is cross-linked and comprises at least 90 wt % of a polymer composition, said polymer composition comprising:
(I) 95.5 to 99.9 wt % of an LDPE; and
(II) 0.1 to 4.5 wt % of an HDPE having a density of at least 940 kg/m$^3$.

Viewed from one aspect the invention provides a cable comprising one or more conductors surrounded by at least an inner semiconductive layer, an insulation layer and an outer semiconductive layer, in that order, wherein the insulation layer is cross-linked and comprises at least 90 wt % of a polymer composition, said polymer composition comprising:
(I) 95.5 to 99.9 wt % of an LDPE; and
(II) 0.1 to 4.5 wt % of an HDPE having a density of at least 940 kg/m$^3$.

Viewed from another aspect the invention provides a cable comprising one or more conductors surrounded by at least an inner semiconductive layer, an insulation layer and an outer semiconductive layer, in that order, wherein the insulation layer is not cross-linked and comprises at least 90 wt % of a polymer composition, said polymer composition comprising:
(I) 95.5 to 99.9 wt % of an LDPE; and
(II) 0.1 to 4.5 wt % of an HDPE, preferably a multimodal HDPE, having a density of at least 940 kg/m$^3$.

Where the insulation layer is not cross-linked, the layer should be free of any crosslinking agent such as a peroxide.

In one embodiment the HDPE component (II) is bimodal, especially where the insulation layer is not crosslinked.

In particular the cable of the invention is a direct current (DC) power cable, preferably operating at or capable of operating at 320 kV or more such as 650 kV or more.

Viewed from another aspect the invention provides a process for producing a cable comprising the steps of:
applying on one or more conductors, preferably by (co) extrusion, an inner semiconductive layer, an insulation layer and an outer semiconductive layer, in that order, wherein the insulation layer comprises at least 90 wt % of a polymer composition as herein before defined and optionally cross-linking the layer.

Viewed from another aspect the invention provides the use of a composition as hereinbefore defined in the insulation layer of a cable.

In all embodiments of the invention it is preferred if the polymer composition of the insulation layer has a conductivity of 1.5 fS/m or less when measured according to DC conductivity method as described under "Determination Method A".

In all embodiment it is preferred if the conductivity of the polymer composition of the insulation layer is $3.5 \times 10^{-17}$ S/cm or less when measured according to DC conductivity method as described under "Determination Methods B".

Definitions

Non cross-linked polymer compositions or cable layers are regarded as thermoplastic.

The polymer composition of the invention may also be referred to as a polymer blend herein. These terms are used interchangeably.

The low density polyethylene, LDPE, of the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from polyethylenes produced in the presence of an olefin polymerisation catalyst. LDPEs have certain typical features, such as different branching architecture.

DETAILED DESCRIPTION OF INVENTION

The present invention requires the use of a particular polymer composition comprising low density polyethylene (LDPE) and low amounts of HDPE in the insulation layer of a cable, especially a power cable such as a direct current (DC) power cable. Unexpectedly, the combination of low amounts of HDPE with the LDPE enables the formation of an insulation layer that has reduced, i.e. low, electrical conductivity. "Reduced" or "low" electrical conductivity as used herein interchangeably means that the value obtained from the DC conductivity measurement as defined below under "Determination methods" is low, i.e. reduced. Low electrical conductivity is beneficial for minimising undesired heat formation in the insulation layer of a cable.

Moreover and unexpectedly, some of the LDPE compositions of the invention and hence the insulation layer of the cable of the invention have low electrical conductivity without the need for crosslinking. Furthermore, the insulation still possesses the mechanical properties needed for an insulation layer of a cable, preferably a DC power cable, such as low flex modulus, good tensile modulus, and good stress crack.

It is also remarkable that such low levels of conductivity are achievable at such low levels of HDPE addition. Because the amount of HDPE added is so low, the blend is "cleaner". LDPE can be manufactured in very pure form without impurities but as soon as LDPE is blended with a low pressure polymer such as HDPE, more gels and catalyst residues are introduced which can lead to defects in the composition. It is therefore preferred if the addition of the HDPE is kept to a minimum to maximise the purity of the insulation layer. It was perceived however that low levels of HDPE addition would not lead to marked improvements in conductivity.

Remarkably, we observe that at very low levels of HDPE addition, conductivity is comparable or sometimes better (i.e. lower) than conductivity achieved at higher HDPE loading. Hence we can minimise conductivity and prepare a purer, defect free insulation layer.

LDPE

The low density polyethylene, LDPE, of the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from polyethylenes produced in the presence of an olefin polymerisation catalyst. LDPEs have certain typical features, such as different branching architecture.

LDPE Homopolymer or Copolymer

The LDPE used in the composition of the invention may have a density of 915 to 940 kg/m$^3$, preferably 918 to 935 kg/m$^3$, especially 920 to 932 kg/m$^3$, such as about 922 to 930 kg/m$^3$.

The LDPE polymer of the invention may be one having a high density. The density of LDPE polymer is preferably 927 to 940 kg/m$^3$, preferably 928 to 935 kg/m$^3$, especially 929 to 932 kg/m$^3$, such as about 930 kg/m$^3$. In particular, this higher density range is employable with the cross-linked multimodal HDPE polymer.

The MFR$_2$ (2.16 kg, 190° C.) of the LDPE polymer is preferably from 0.05 to 30.0 g/10 min, more preferably is from 0.1 to 20 g/10 min, and most preferably is from 0.1 to 10 g/10 min, especially 0.1 to 5.0 g/10 min. In a preferred embodiment, the MFR$_2$ of the LDPE is 0.1 to 4.0 g/10 min, especially 0.5 to 4.0 g/10 min, especially 1.0 to 3.0 g/10 min.

The LDPE may have a tensile modulus (1 mm/min ISO527-2) of at least 300 MPa, such as at least 325 MPa. Values up to 600 MPa are possible.

The LDPE may have a flex modulus (ISO178) of at least 300 MPa, such as at least 320 MPa. Values up to 600 MPa are possible.

It is possible to use a mixture of LDPEs in the polymer composition of the invention however it is preferred if a single LDPE is used.

The LDPE may be a low density homopolymer of ethylene (referred herein as LDPE homopolymer) or a low density copolymer of ethylene with one or more comonomer(s) (referred herein as LDPE copolymer). The one or more comonomers of the LDPE copolymer are preferably selected from the polar comonomer(s), non-polar comonomer(s) or from a mixture of the polar comonomer(s) and non-polar comonomer(s). Moreover, said LDPE homopolymer or LDPE copolymer may optionally be unsaturated.

As a polar comonomer for the LDPE copolymer, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof.

If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, mono-unsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 35 wt.-%, still more preferably less than 30 wt.-%, more preferably less than 25 wt.-%, of one or more comonomer(s). Preferred ranges include 0.5 to 10 wt %, such as 0.5 to 5 wt % comonomer.

The LDPE polymer, may optionally be unsaturated, i.e. may comprise carbon-carbon double bonds (—C═C—). Preferred "unsaturated" LDPEs contains carbon-carbon double bonds/1000 carbon atoms in a total amount of at least 0.4/1000 carbon atoms. If a non-cross-linked LDPE is used in the final cable, then the LDPE is typically not unsaturated as defined above. By not unsaturated is meant that the C═C content is preferably less than 0.2/1000 carbon atoms, such as 0.1/1000 C atoms or less.

As well known, the unsaturation can be provided to the LDPE polymer by means of the comonomers, a low molecular weight (Mw) additive compound, such as a crosslinking booster, CTA or scorch retarder additive, or any combinations thereof. The total amount of double bonds means herein double bonds added by any means. If two or more above sources of double bonds are chosen to be used for providing the unsaturation, then the total amount of double bonds in the LDPE polymer means the sum of the double bonds present. Any double bond measurements are carried out prior to optional crosslinking.

The term "total amount of carbon-carbon double bonds" refers to the combined amount of double bonds which originate from vinyl groups, vinylidene groups and trans-vinylene groups, if present.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable for the unsaturated second polyolefin (b) preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, preferably to the total amount of the vinyl groups. Herein, when a compound which can also act as comonomer, such as propylene, is used as CTA for providing double bonds, then said copolymerisable comonomer is not calculated to the comonomer content.

If LDPE polymer is unsaturated, then it has preferably a total amount of carbon-carbon double bonds, which originate from vinyl groups, vinylidene groups and trans-vinylene groups, if present, of more than 0.4/1000 carbon atoms, preferably of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is preferably higher than 0.40/1000 carbon atoms, preferably higher than 0.50/1000 carbon atoms, preferably higher than 0.60/1000 carbon atoms.

If the LDPE is unsaturated LDPE as defined above, it contains preferably at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms. More preferably, the second polyolefin (b), prior to crosslinking, contains vinyl groups in total amount of more than 0.20/1000 carbon atoms, still more preferably of more than 0.30/1000 carbon atoms.

It is however, preferred if the LDPE of the invention is not unsaturated and possesses less than 0.2 C=C/1000 C atoms, preferably less than 0.1 C=C/1000 C atoms. It is also preferred if the LDPE is a homopolymer. As the polymer composition of the invention is not designed for crosslinking, the presence of unsaturation within the LDPE is not required or desired.

The LDPE polymer may have a high melting point, which may be of importance especially for a thermoplastic insulation material. Melting points of 112° C. or more are envisaged, such as 114° C. or more, especially 116° C. or more, such as 112 to 125° C.

The LDPE polymer is produced at high pressure by free radical initiated polymerisation (referred to as high pressure (HP) radical polymerization). The HP reactor can be e.g. a well-known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system.

Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerising the ethylene e.g. in the presence of one or more polyunsaturated comonomer(s), chain transfer agent(s), or both, using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner.

The polymer composition of the invention preferably comprises 95.5 to 99.8 wt % of the LDPE. Preferably, the composition comprises 96.0 to 99.5 wt %, such as 96.5 to 99.5 wt % of the LDPE, especially 97.0 to 99.0 wt %.

High Density Polyethylene Component

The composition of the invention may include a high density polyethylene component which may be unimodal or multimodal. Where the insulation layer is thermoplastic, a multimodal HDPE is preferably used. Where the insulation layer is cross-linked, either a unimodal or multimodal insulation layer can be used, preferably a unimodal HDPE. The polymer is one having a density of at least 940 kg/m$^3$.

The term "multimodal" means herein, unless otherwise stated, multimodality with respect to molecular weight distribution and includes therefore a bimodal polymer. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

A unimodal polymer, unless otherwise stated, is unimodal with respect to molecular weight distribution and therefore contains a single peak on is GPC curve.

The HDPE component (II) of the blend of the invention is preferably present in an amount of 0.2 to 4.5 wt %, such as 0.5 to 4.0 wt %, preferably 0.5 to 3.5 wt %, such as 1.0 to 3.0 wt %.

The HDPE preferably has a density according to ISO 1183 at 23° C. of at least 940 kg/m³, preferably at least 945 kg/m³. The upper limit for density may by 980 kg/m³, preferably 975 kg/m³, especially 970 kg/m³. A highly preferred density range is 945 to 965 kg/m³, such as 954 to 965 kg/m³.

The $MFR_2$ according to ISO 1133 of the HDPE is preferably in the range of 0.1 to 40 g/10 min, preferably 0.25 to 20 g/10 min. Preferably the HDPE has an $MFR_2$ of 0.3 to 15 g/10 min. An especially preferred range is 0.4 to 15 g/10 min.

In another embodiment, the HDPE may have an $MFR_{21}$ according to ISO 1133 of the HDPE is preferably in the range of 8 to 30 g/10 min, preferably 10 to 20 g/10 min.

In some embodiments of the invention, it is preferable if the HDPE is a multimodal polyethylene comprising at least (i) a lower weight average molecular weight (LMW) ethylene homopolymer or copolymer component, and (ii) a higher weight average molecular weight (HMW) ethylene homopolymer or copolymer component. Preferably, at least one of said LMW and HMW components is a copolymer of ethylene with at least one comonomer. It is preferred that at least said HMW component is an ethylene copolymer. Alternatively, if one of said components is a homopolymer, then said LMW is the preferably the homopolymer.

Said LMW component of multimodal polymer preferably has a $MFR_2$ of at least 5 g/10 min, preferably at least 50 g/10 min, more preferably at least 100 g/10 min.

The density of LMW component of said multimodal polymer may range from 950 to 980 kg/m³, e.g. 950 to 970 kg/m³.

The LMW component of said multimodal polymer may form from 30 to 70 wt %, e.g. 40 to 60% by weight of the multimodal polymer with the HMW component forming 70 to 30 wt %, e.g. 60 to 40% by weight. In one embodiment said LMW component forms 50 wt % or more of the multimodal polymer as defined above or below. Typically, the LMW component forms 45 to 55% and the HMW component forms 55 to 45% of the multimodal polymer.

The HMW component of said HDPE has a lower $MFR_2$ than the LMW component.

The HDPE may be an ethylene homopolymer or copolymer. By ethylene homopolymer is meant a polymer which is formed essentially only ethylene monomer units, i.e. is 99.9 wt % ethylene or more. It will be appreciated that minor traces of other monomers may be present due to industrial ethylene containing trace amounts of other monomers.

The HDPE may also be a copolymer (and is preferably a copolymer) and can therefore be formed from ethylene with at least one other comonomer, e.g. $C_{3-20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred.

The HDPE can comprise one monomer or two monomers or more than 2 monomers. The use of a single comonomer is preferred. If two comonomers are used it is preferred if one is an $C_{3-8}$ alpha-olefin and the other is a diene as hereinbefore defined.

The amount of comonomer is preferably such that it comprises 0-3 mol %, more preferably 0.1-2.0 mol % and most preferably 0.1-1.5 mol % of the HDPE. Values under 1.0 mol % are also envisaged, e.g. 0.1 to 1.0 mol %. These can be determined by NMR.

It is preferred however if the ethylene polymer of the invention comprises a LMW homopolymer component and a HMW ethylene copolymer component, e.g. an ethylene hexene copolymer or an ethylene butene copolymer.

For the preparation of the HDPE polymerisation methods well known to the skilled person may be used. It is within the scope of the invention for a multimodal, e.g. at least bimodal, polymers to be produced by blending each of the components in-situ during the polymerisation process thereof (so called in-situ process) or, alternatively, by blending mechanically two or more separately produced components in a manner known in the art.

Polyethylenes useful in the present invention are preferably obtained by in-situ blending in a multistage polymerisation process. Accordingly, polymers are obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

In a highly preferred embodiment, the HDPE polymer of the invention is prepared by single-site catalysed polymerisation. The use of a single-site catalysed ethylene polymer gives better conductivity, than for example a Ziegler Natta based catalyst. Further, the use of single site catalysed polymer allows a lower amount of crosslinking agent to be used to reach the desired degree of crosslinking than for example a Ziegler Natta based catalyst. More importantly, the SSC HDPE is a "cleaner" polymer meaning there is less impurity in the cable and less chance of defects. The HDPE as defined herein may be made using any conventional single site catalysts, including metallocenes and non-metallocenes as well known in the field.

Preferably said catalyst is one comprising a metal coordinated by one or more η-bonding ligands. Such η-bonded metals are typically transition metals of Group 3 to 10, e.g. Zr, Hf or Ti, especially Zr or Hf. The η-bonding ligand is typically an η-cyclic ligand, i.e. a homo or heterocyclic cyclopentadienyl group optionally with fused or pendant substituents. Such single site, preferably metallocene, procatalysts have been widely described in the scientific and patent literature for about twenty years. Procatalyst refers herein to said transition metal complex.

The metallocene procatalyst may have a formula II:

$(Cp)_m R_n MX_q$      (II)

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$-alkyl, tri($C_{1-20}$-alkyl)silyl, tri($C_{1-20}$-alkyl)siloxy or $C_{6-20}$-aryl substituents); or a bridge of 1-3, e.g. one or two, hetero atoms, such as silicon, germanium and/or oxygen atom(s), e.g. —SiR$^1_2$—, wherein each $R^1$ is independently $C_{1-20}$-alkyl, $C_{6-20}$-aryl or tri($C_{1-20}$-alkyl)silyl-residue, such as trimethylsilyl;

M is a transition metal of Group 3 to 10, preferably of Group 4 to 6, such as Group 4, e.g. Ti, Zr or Hf, especially Hf;

each X is independently a sigma-ligand, such as H, halogen, $C_{1-20}$-alkyl, $C_{1-20}$-alkoxy, $C_2$-$C_{20}$-alkenyl, $C_2$-$C_{20}$-alkynyl, C3-C12-cycloalkyl, C6-$C_{20}$-aryl, C6-$C_{20}$-aryloxy, C7-$C_{20}$-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-$C_{20}$-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R1 can further be substituted e.g. with C1-C20-alkyl which may contain Si and/or O atoms;

n is 0, 1 or 2, e.g. 0 or 1,
m is 1, 2 or 3, e.g. 1 or 2,
q is 1, 2 or 3, e.g. 2 or 3,
wherein m+q is equal to the valency of M.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula II, each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, if present, is preferably a methylene, ethylene or a silyl bridge, whereby the silyl can be substituted as defined above, e.g. a (dimethyl)Si═, (methylphenyl)Si═ or (trimethylsilylmethyl)Si═; n is 0 or 1; m is 2 and q is two. Preferably, R" is other than hydrogen.

A specific subgroup includes the well known metallocenes of Zr, Hf and Ti with two η-5-ligands which may be bridged or unbridged cyclopentadienyl ligands optionally substituted with e.g. siloxy, or alkyl (e.g. C1-6-alkyl) as defined above, or with two unbridged or bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a ƒ1 or η2 ligand, wherein said ligands may or may not be bridged to each other. Such compounds are described e.g. in WO-A-9613529, the contents of which are incorporated herein by reference.

Further preferred metallocenes include those of formula (I)

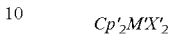

wherein each X' is halogen, $C_{1-6}$ alkyl, benzyl or hydrogen;
M' is Hf or Zr;
Cp' is a cyclopentadienyl or indenyl group optionally substituted by a $C_{1-10}$ hydrocarbyl group or groups and being optionally bridged, e.g. via an ethylene or dimethylsilyl link.

Especially preferred catalysts are bis-(n-butyl cyclopentadienyl) hafnium dibenzyl, and bis-(n-butyl cyclopentadienyl) zirconium dichloride.

Metallocene procatalysts are generally used as part of a catalyst system which also includes a catalyst activator, called also as cocatalyst. Useful activators are, among others, aluminium compounds, like aluminium alkoxy compounds. Suitable aluminium alkoxy activators are for example methylaluminoxane (MAO), hexaisobutylaluminoxane and tetraisobutylaluminoxane. In addition boron compounds (e.g. a fluoroboron compound such as triphenylpentafluoroboron or triphentylcarbenium tetraphenylpentafluoroborate (($(C_6H_5)_3$B+B—$(C_6F_5)_4$)) can be used as activators. The cocatalysts and activators and the preparation of such catalyst systems is well known in the field. For instance, when an aluminium alkoxy compound is used as an activator, the Al/M molar ratio of the catalyst system (Al is the aluminium from the activator and M is the transition metal from the transition metal complex) is suitable from 50 to 500 mol/mol, preferably from 100 to 400 mol/mol. Ratios below or above said ranges are also possible, but the above ranges are often the most useful.

If desired the procatalyst, procatalyst/cocatalyst mixture or a procatalyst/cocatalyst reaction product may be used in supported form (e.g. on a silica or alumina carrier), unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO03/051934 which is incorporated herein as a reference.

It is also possible to use combinations of different activators and procatalysts. In addition additives and modifiers and the like can be used, as is known in the art.

Any catalytically active catalyst system including the procatalyst, e.g. metallocene complex, is referred herein as single site or metallocene catalyst (system).

Ideally therefore, the HDPE used in the blend of the invention are produced in at least two-stage polymerization using a single site catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor-gas phase reactor system is well known as Borealis technology, i.e. as a BORSTAR™ reactor system. Such a multistage process is disclosed e.g. in EP517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene.

The ethylene concentration in the first, preferably loop, reactor may be around 5 to 15 mol %, e.g. 7.5 to 12 mol %.

In the second, preferably gas phase, reactor, ethylene concentration is preferably much higher, e.g. at least 40 mol % such as 45 to 65 mol %, preferably 50 to 60 mol %.

Preferably, the first polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane. The reaction product is then transferred, preferably to continuously operating gas phase reactor. The second component can then be formed in a gas phase reactor using preferably the same catalyst.

The HDPE is a commercial product and can be purchased from various suppliers.

Polymer Composition

The polymer composition of use in the insulation layer of the invention comprises the HDPE and LDPE mixed in ratios as herein before defined. The polymer composition preferably consists essentially of the components (I) and (II). The term consists essentially of implies that there are no other polymer components present in the composition. It will be appreciated that the polymer composition may contain standard polymer additives discussed in more detail below. The term consists essentially of is used to exclude the presence of other polymer components but is intended to allow the option of additives being present.

During manufacture of the composition, the components can be blended and homogenously mixed, e.g. melt mixed in an extruder.

Conductivity

In all embodiments of the invention it is preferred if the conductivity of the polymer composition or the conductivity of the insulation layer is 1.5 fS/m or less when determined using method A.

As we demonstrate in the examples, in a crosslinked insulation layer, where the LDPE is combined with a low amount of HDPE, such as 1 to 3 wt %, the resulting blend has a remarkably low conductivity, e.g. 1.0 fS/m measured via DC method A. In contrast, when 5 wt % is used a much higher value is measured (see WO2011/113686). Low HDPE content is therefore surprisingly associated with lower conductivity in crosslinked materials. Lower HDPE also means less impurity and hence less change of defects in the insulation layer.

In thermoplastic applications, lower HDPE offers comparable conductivity to higher HDPE percentages and better purity. Where the HDPE is multimodal, lower conductivity is observed in thermoplastic embodiments.

In all embodiments, it is preferred if the conductivity of the polymer composition of the insulation layer is $3.5 \times 10^{-17}$ S/cm or less when measured according to DC conductivity method as described under "Determination Methods B", such as $3.0 \times 10^{-17}$ S/cm or less.

We have also found that in the context of a thermoplastic blend, the use of a bimodal material as the HDPE leads to lower conductivity.

Cables

The cable of the invention is preferably a DC cable. A DC power cable is defined to be a DC cable transferring energy operating at any voltage level, typically operating at voltages higher than 1 kV. The DC power cable can be a low voltage (LV), a medium voltage (MV), a high voltage (HV) or an extra high voltage (EHV) DC cable, which terms, as well known, indicate the level of operating voltage. The polymer is even more preferable used in the insulation layer for a DC power cable operating at voltages higher than 36 kV, such as a HV DC cable. For HV DC cables the operating voltage is defined herein as the electric voltage between ground and the conductor of the high voltage cable.

Preferably the HV DC power cable of the invention is one operating at voltages of 40 kV or higher, even at voltages of 50 kV or higher. More preferably, the HV DC power cable operates at voltages of 60 kV or higher. The invention is also highly feasible in very demanding cable applications and further cables of the invention are HV DC power cable operating at voltages higher than 70 kV. Voltages of 100 kV or more are targeted, such as 200 kV or more, more preferably 300 KV or more, especially 400 kV or more, more especially 500 kV or more. Voltages of 640 KV or more, such as 700 kV are also envisaged. The upper limit is not limited. The practical upper limit can be up to 1500 kV such as up to 1100 kV. The cables of the invention operate well therefore in demanding extra HV DC power cable applications operating 400 to 850 kV, such as 650 to 850 kV.

A cable, such as a DC cable, comprises an inner semiconductive layer comprising a first semiconductive composition, an insulation layer comprising the polymer composition of the invention and an outer semiconductive layer comprising a second semiconductive composition, in that order.

The polymer composition of the invention is used in the insulation layer of the cable. Ideally, the insulation layer comprises at least 95 wt %, such as at least 98 wt % of the polymer composition of the invention, such as at least 99 wt %. It is preferred therefore if the polymer composition of the invention is the only non-additive component used in the insulation layer of the cables of the invention. Thus, it is preferred if the insulation layer consists essentially of the composition of the invention. The term consists essentially of is used herein to mean that the only polymer composition present is that defined. It will be appreciated that the insulation layer may contain standard polymer additives such as scorch retarders, water tree retarders, antioxidants and so on. These are not excluded by the term "consists essentially of". Note also that these additives may be added as part of a masterbatch and hence carried on a polymer carrier. The use of masterbatch additives is not excluded by the term consists essentially of.

The insulation layer can have a beneficial low electrical conductivity when it is cross-linked with a crosslinking agent. The insulation layer of the cables of the invention can thus optionally be crosslinkable.

The term crosslinkable means that the insulation layer can be cross-linked using a crosslinking agent before use. The insulation layer will need to comprise a crosslinking agent in order to be crosslinkable, typically a free radical generating agent. The cross-linked polymer composition has a typical network, i.a. interpolymer crosslinks (bridges), as well known in the field.

If the insulation layer is cross-linked, any parameter of the insulation layer other than conductivity is ideally measured before the crosslinking unless otherwise indicated. In embodiments, wherein the insulation layer comprises no crosslinking agent, the electrical conductivity as described under the "Determination method" is measured from a sample of polymer forming the insulation layer which is non-cross-linked (i.e. does not contain a crosslinking agent and has not been cross-linked with a crosslinking agent). In embodiments, wherein the insulation layer is cross-linked with a crosslinking agent, then the electrical conductivity is measured from a sample of the cross-linked polymer (i.e. a sample of the polymer is first cross-linked with the cross-linking agent initially present and then the electrical conductivity is measured from the obtained cross-linked sample). The conductivity measurement from a non-cross-linked or a cross-linked polymer composition sample is described under "Determination Methods".

The amount of the crosslinking agent used, if present, can vary, preferably within the ranges given below. Preferably a peroxide is used in an amount of 0 to 110 mmol —O—O—/kg polymer composition of the insulation layer, preferably 0 to 90 mmol —O—O—/kg polymer composition (corresponds 0 to 2.4 wt % of dicumyl peroxide based on the polymer composition), preferably of 0 to 37 mmol —O—O—/kg polymer composition, preferably of 0 to 35 mmol —O—O—/kg polymer composition, preferably of 0 to 34 mmol —O—O—/kg polymer composition, preferably of 0 to 33 mmol —O—O—/kg polymer composition, more preferably from 0 to 30 mmol —O—O—/kg polymer composition, more preferably from 0 to 20 mmol —O—O—/kg polymer composition, more preferably from 0 to 10.0 mmol —O—O—/kg polymer composition, more preferably from 0 to 7.0 mmol —O—O—/kg polymer composition, more preferably less than 5.0 mmol —O—O—/kg polymer composition, most preferably the polymer composition comprises no crosslinking agent (=0 wt % of added crosslinking agent). The insulation layer is thus ideally free of byproducts of the decomposition of the peroxide.

The lower limit of the crosslinking agent, if present, is not limited and can be at least 0.1 mmol —O—O—/kg polymer composition in the insulation layer, preferably at least 0.5 mmol —O—O—/kg polymer composition, more preferably at least 5.0 mmol —O—O—/kg polymer composition. The lower peroxide content can shorten the required degassing step of the produced and cross-linked cable, if desired.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well-known dicumyl peroxide based on the total amount (100 wt %) of the polymer composition.

Such polymer composition may comprise one type of peroxide or two or more different types of peroxide, in which case the amount (in mmol) of —O—O—/kg polymer composition, as defined above, below or in claims, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl) peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl) peroxide, or mixtures thereof. Most preferably, the peroxide is dicumylperoxide.

Where the insulation layer is not crosslinked, it is preferred that the insulation layer comprises no crosslinking agent. The prior art drawbacks relating to the use of a crosslinking agent in cable layer can therefore be avoided. Naturally, the non cross-linked embodiment also simplifies the cable production process. As no crosslinking agent is required, the raw material costs are lower. Also, it is generally required to degas a cross-linked cable layer to remove the by-products of the peroxide after crosslinking. Where the material is not cross-linked, no such degassing step is required.

The insulation layer may contain, in addition to the LDPE blend and the optional peroxide, further component(s) such as additives (such as any of antioxidant(s), scorch retarder(s) (SR), crosslinking booster(s), stabiliser(s), processing aid(s), flame retardant additive(s), water tree retardant additive(s), acid or ion scavenger(s), inorganic filler(s) and voltage stabilizer(s), as known in the polymer field.

The insulation layer may therefore comprise conventionally used additive(s) for W&C applications, such as one or more antioxidant(s) and optionally one or more scorch retarder(s), preferably at least one or more antioxidant(s). The used amounts of additives are conventional and well known to a skilled person, e.g. 0.1 to 1.0 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Preferably, the insulation layer does not comprise a carbon black. Also preferably, the insulation layer does not comprise flame retarding additive(s), e.g. a metal hydroxide containing additives in flame retarding amounts.

The cable of the invention also contains inner and outer semiconductive layers. These can be made of any conventional material suitable for use in these layers. The inner and the outer semiconductive compositions can be different or identical and may comprise a polymer(s) which is preferably a polyolefin or a mixture of polyolefins and a conductive filler, preferably carbon black. Suitable polyolefin(s) are e.g. polyethylene produced in a low pressure process or a polyethylene produced in a HP process (LDPE). The carbon black can be any conventional carbon black used in the semiconductive layers of a DC power cable, preferably in the semiconductive layer of a DC power cable. Preferably the carbon black has one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, preferably furnace carbon black and acetylene carbon black. Preferably, the polymer composition comprises 10 to 50 wt % carbon black, based on the weight of the Semiconductive composition.

In a preferable embodiment, the outer semiconductive layer is cross-linked. In another preferred embodiment, the inner semiconductive layer is preferably non-cross-linked. Overall therefore it is preferred if the inner semiconductive layer and the insulation layer remain non cross-linked where the outer semiconductive layer is cross-linked. A peroxide crosslinking agent can therefore be provided in the outer semiconductive layer only.

The cable comprises one or more conductors, e.g. wires. Preferably the conductor is an electrical conductor and comprises one or more metal wires. Cu wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of—applying on a conductor, preferably by (co)extrusion, an inner semiconductive layer, an insulation layer and an outer semiconductive layer, in that order, wherein the insulation layer comprises the composition of the invention.

The process may optionally comprise the steps of crosslinking one or both of the inner semiconductive layer or outer semiconductive layer, without crosslinking the insulation layer. Preferably however, no layer is cross-linked. The cable of the invention is ideally thermoplastic. More preferably, a cable is produced, wherein the process comprises the steps of (a)—providing and mixing, preferably melt mixing in an extruder, an optionally crosslinkable first semiconductive composition comprising a polymer, a carbon black and optionally further component(s) for the inner semiconductive layer, providing and mixing, preferably melt mixing in an extruder, the polymer composition of the invention; and providing and mixing, preferably melt mixing in an extruder, a second semiconductive composition which is optionally crosslinkable and comprises a polymer, a carbon black and optionally further component(s) for the outer semiconductive layer, (b) applying on one or more conductors, preferably by coextrusion, a melt mix of the first semiconductive composition obtained from step (a) to form the inner semiconductive layer, a meltmix of polymer composition of the invention obtained from step (a) to form the insulation layer, and a meltmix of the second semiconductive composition obtained from step (a) to form the outer semiconductive layer, and (c) optionally crosslinking at crosslinking conditions one or both of the first semiconductive composition of the inner semiconductive layer and the second semiconductive composition of the outer semiconductive layer, of the obtained cable, without crosslinking the insulation layer.

Preferably in step (c) the second semiconductive polymer composition of the outer semiconductive layer is crosslinked. Also preferably, the second semiconductive polymer composition of the outer semiconductive layer is crosslinked, without crosslinking the insulation layer or the first semiconductive composition of the inner semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and preferred first and second semiconductive compositions can be produced before or during the cable production process.

Preferably, the polymers required to manufacture the cable of the invention are provided to the cable production process in form of powder, grain or pellets. Pellets mean herein generally any polymer product which is formed from reactor-made polymer (obtained directly from the reactor) by post-reactor modification to solid polymer particles.

Accordingly, the LDPE and the component (II) material can be premixed, e.g. melt mixed together and pelletized, before mixing. Alternatively, and preferably, these components can be provided in separate pellets to the (melt) mixing step (a), where the pellets are blended together.

The (melt) mixing step (a) of the provided polymer composition of the invention and of the preferable first and second semiconductive compositions is preferably carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s).

Any crosslinking agent can be added before the cable production process or during the (melt) mixing step (a). For instance, and preferably, the crosslinking agent and also the optional further component(s), such as additive(s), can already be present in the polymers used. The crosslinking agent is added, preferably impregnated, onto the solid polymer particles, preferably pellets.

It is preferred that the melt mix of the polymer composition obtained from (melt)mixing step (a) consists of the LDPE (I) and second component (II) as the sole polymer component(s). The optional and preferable additive(s) can be added to polymer composition as such or as a mixture with a carrier polymer, i.e. in a form of so-called master batch.

The crosslinking of other layers can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The nature of the cooling process is important in governing the properties of the insulation layer. Once the polymer material has been extruded the polymer composition needs to cool. This can be effected quickly or slowly depending on the conditions applied to the cable.

The inventors have found that rapid quenching maximizes the formation of co-crystals, whereas slow cooling increasingly favors segregation of LDPE and HDPE and thus the formation of pure crystalline domains. Improved creep properties are generally observed with slower cooling. It is thus a further object of the invention if the composition of the insulation layer is cooled at a rate of less than 5° C./min.

The thickness of the insulation layer of the cable, more preferably of the DC power cable such as HV DC power cable, is typically 2 mm or more, preferably at least 3 mm, preferably of at least 5 to 100 mm, more preferably from 5 to 50 mm, and conventionally 5 to 40 mm, e.g. 5 to 35 mm, when measured from a cross section of the insulation layer of the cable.

The thickness of the inner and outer semiconductive layers is typically less than that of the insulation layer, and in HV DC power cables can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.5-3.0 mm, preferably 0.8-2.0 mm. The thickness of the outer semiconductive layer is preferably from 0.3 to 10 mm, such as 0.3 to 5 mm, preferably 0.5 to 3.0 mm, preferably 0.8-3.0 mm. It is evident for and within the skills of a skilled person that the thickness of the layers of the DC cable depends on the intended voltage level of the end application cable and can be chosen accordingly.

The preferable embodiments of the invention can be combined with each other in any way to further define the invention.

The invention will now be described with reference to the following non limiting examples.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$) or block-like (as in heterophasic PP copolymer) (720 $cm^{-1}$). The absorbance at 4324 $cm^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13 C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13 C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Low Density Polyethylene (1) Polymers Containing >6 wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains 0.20/$M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g. The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Low pressure process polyethylene: Density of the polymer was measured according to ISO 1183/1872-2B.

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000 C) via:

$$N=(A\times 14)/(E\times L\times D)$$

were A is the maximum absorbance defined as peak height, E the molar extinction coefficient of the group in question (l·mol$^{-1}$·mm$^{-1}$), L the film thickness (mm) and D the density of the material (g·cm$^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 cm$^{-1}$ and analysed in absorption mode.

1) Polymer Compositions Comprising Polyethylene Homopolymers and Copolymers, Except Polyethylene Copolymers with >0.4 wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 l·mol$^{-1}$·mm$^{-1}$ vinylidene (RR'C=CH2) via 888 cm$^{-1}$ based on 2-methyl-1-heptene [2-methyhept-1-ene] giving E=18.24 l·mol$^{-1}$·mm$^{-1}$ trans-vinylene (R—CH=CH—R') via 965 cm$^{-1}$ based on trans-4-decene [(E)-dec-4-ene] giving E=15.14 l·mol$^{-1}$·mm$^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 l·mol$^{-1}$·mm$^{-1}$ vinylidene (RR'C=CH2) via 888 cm$^{-1}$ based on 2-methyl-1-heptene [2-methyl-hept-1-ene] giving E=18.24 l·mol$^{-1}$·mm$^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^1$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as l·mol$^{-1}$·mm$^{-1}$ via:

$$E=A/(C\times L)$$

where A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined.

DC Conductivity Methods

Method A

The plaques are compression moulded from pellets of the test polymer composition. The final plaques have a thickness of 1 mm and 200×200 mm.

The conductivity measurement can be performed using a test polymer composition which does not comprise or comprises the optional crosslinking agent. In case of no crosslinking agent, the conductivity is measured from a non-crosslinked plaque sample using the below procedure. If the test polymer composition comprises the crosslinking agent, then the crosslinking occurs during the preparation of the plaque samples, whereby the conductivity is then measured according to the below procedure from the resulting crosslinked plaque sample. Crosslinking agent, if present in the polymer composition prior to crosslinking, is preferably a peroxide, as herein.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min during which the plaque becomes fully crosslinked by means of the peroxide, if present in the test polymer composition. Finally the temperature is decreased using the cooling rate 15° C./min until room temperature is reached when the pressure is released. The plaques are immediately after the pressure release wrapped in metallic foil in order to prevent loss of volatile substances.

If the plaque is to be degassed (i.e. after crosslinking) it is placed in a ventilated oven at atmospheric pressure for 24 h at 70° C. Thereafter the plaque is again wrapped in metallic foil in order to prevent further exchange of volatile substances between the plaque and the surrounding.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

DC Conductivity Method B (Values in S/Cm)

Broadband Dielectric Spectroscopy (BDS)

Samples (40×100 mm) were made by hot pressing at 250° C. and 100 kN press force. Spacers with a thickness of 0.1 mm were used to control thickness. Disk-shaped samples were then cut out of the plaques.

All measurements were performed on disk-shaped samples with 40 mm diameter and ~0.1 mm thickness. The conductivity measurements were obtained by the use of dielectric spectrometer.

Broadband Dielectric Spectroscopy (BDS) was performed using a Novocontrol alpha spectrometer in a frequency range of 10$^{-2}$ to 10$^7$ Hz, at different temperatures in the range 253-383K with an error of ±0.1K, at atmospheric pressure and under nitrogen atmosphere. For selected temperatures frequency scans were also performed to investigate the local and ion dynamics. The sample cell consisted of two silver-coated electrodes 40 mm in diameter and the sample with a thickness of about 0.1 mm. The complex dielectric permittivity $\varepsilon^*=\varepsilon'-i\varepsilon''$, where $\varepsilon'$ is the real and $\varepsilon''$ is the imaginary part, is generally a function of frequency, $\omega$, temperature T, and pressure P$^1$, although here only the frequency and temperature dependencies have been investigated. The complex dielectric conductivity $\sigma^*$ can be also calculated from the complex dielectric function $\varepsilon^*$ as $\sigma^*=i\omega\varepsilon_f\varepsilon^*$, ($\varepsilon_f$ is the permittivity of free space, 8.854 pF/m) where conductivity can also be analysed in a real and an imaginary part: $\sigma^*=\sigma'+i\sigma''$. This means the conductivity data are effectively an alternative representation of the permittivity, nevertheless focusing on different features of the dielectric behaviour as we will discuss below. The analysis has been made using the empirical equation of Havriliak and Negami[2]

$$\frac{\varepsilon^*(\omega, T, P) - \varepsilon(T, P)}{\Delta\varepsilon(T, P)} = \frac{1}{[1 + (i\omega\tau_{HN}(T, P))a]^\gamma}$$

where $\tau_{HN}(T,P)$ is the characteristic relaxation time in this equation, $\Delta\varepsilon(T,P)$ is the relaxation strength of the process under investigation, $\varepsilon_\infty$, is the dielectric permittivity at the limit of high frequencies, and $\alpha$, $\gamma$ ($0<\alpha$, $\alpha\gamma\leq1$) describe, respectively, the symmetrical and asymmetrical broadening of the distribution of relaxation times. The relaxation times at maximum loss ($\tau_{max}$) presented herein have been analytically obtained by fitting the relaxation spectra with the Havriliak-Negami (HN) equation as follows:

$$\tau_{max} = \tau_{HN}\left[\frac{\sin\left(\frac{\pi\alpha}{2(1+\gamma)}\right)}{\sin\left(\frac{\pi\alpha\gamma}{2(1+\gamma)}\right)}\right]^{-1/\alpha}$$

EXPERIMENTAL PART

The following materials are used in the examples:
LDPE1—LDPE homopolymer having the properties in table 1:

TABLE 1

| Base Resin Properties | LDPE1 |
| --- | --- |
| MFR$_2$, 190° C. [g/10 min] | 0.3 |
| Density [kg/m$^3$] | 930 |
| Tensile modulus | 350 MPa |
| Flex Modulus | 330 MPa |

LDPE 2—an LDPE copolymer with octadiene of density 922 kg/m$^3$ and MFR$_2$ of 2.0 g/10 min.
HDPE1: A bimodal high density polyethylene made using Ziegler Natta catalysis, density 946 kg/m$^3$ and MFR$_2$ 0.45 g/10 min.
HDPE2: A unimodal high density polyethylene made using Ziegler Natta catalysis, density 962 kg/m$^3$ and MFR$_2$ of 12 g/10 min, comonomer butene.
Compounding of the Polymer Compositions:
Each polymer component of the composition was added as separate pellets to a pilot scale extruder (Prism TSE 24TC), other than the crosslinking agent. The obtained mixture was meltmixed in conditions given in the below table and extruded to pellets in a conventional manner.

| Set Values Temperatures [° C.] | | | | | | Extruder | | | |
| --- | --- | --- | --- | --- | --- | --- | --- | --- | --- |
| Zone 1 | Zone 2 | Zone 3 | Zone 4 | Zone 5 | Zone 6 | rpm | Output [kg/h] | Pressure [bar] | Filter [mesh] |
| 80 | 155 | 165 | 175 | 175 | 180 | 225 | 7.5 | 60 | 325 |

The crosslinking agent if present, was added on to the pellets and the resulting pellets were used for the experimental part.

Example 1—Thermoplastic Blends

TABLE 2

| | CE1 | IE1 | CE2 |
| --- | --- | --- | --- |
| LDPE1 | 100 | 98 | 95 |
| BM ZN HDPE1 | | 2 | 5 |
| DC Conductivity method B (S/cm) | 1.10E−14 | 2.95E−17 | 3.78E−17 |

Surprisingly, at 2 wt % of HDPE, conductivity is lower with the bimodal grade.

Example 2—Crosslinked Polymers

The mixtures in table 3 were prepared as described above.

TABLE 3

| | Crosslinked Blends | | | | |
| --- | --- | --- | --- | --- | --- |
| Recipe name | CE3 | IE2 | IE3 | IE4 | CE4 |
| LDPE2 wt % | 100 | 99 | 98 | 97 | 90 |
| HDPE2 wt % | 0 | 1 | 2 | 3 | 10 |
| Peroxide (DCP) wt % | +0.4 | +0.4 | +0.4 | +0.4 | +0.4 |
| DC method A (fS/m) | 11.1 | 0.7 | 0.9 | 0.6 | 1.8 |

The invention claimed is:
1. A cable comprising one or more conductors surrounded by at least an inner semiconductive layer, an insulation layer and an outer semiconductive layer, in that order, wherein the insulation layer is not crosslinked or is cross-linked and comprises at least 90 wt % of a polymer composition, said polymer composition comprising:
 (I) 95.5 to 99.9 wt % of an LDPE; and
 (II) 0.1 to 4.5 wt % of an HDPE having a density of at least 940 kg/m$^3$.
2. The cable of claim 1, wherein the cable is a power cable.
3. The cable of claim 2, wherein the power cable is a direct current (DC) power cable, operating at or capable of operating at 320 kV or more.
4. The cable of claim 1, wherein the LDPE has an MFR$_2$ (2.16 kg, 190° C.) of 0.1 to 10 g/10 min.
5. The cable of claim 4, wherein the LDPE has an MFR$_2$ (2.16 kg, 190° C.) of 0.1 to 5.0 g/10 min.
6. The cable of claim 1, wherein the LDPE is a homopolymer.
7. The cable of claim 1, wherein the HDPE has a density of 945 to 965 kg/m$^3$.
8. The cable of claim 1, wherein the LDPE has a density of 920 to 932 kg/m$^3$.

9. The cable of claim 1, wherein the HDPE has a $MFR_2$ (2.16 kg, 190° C.) of 0.1-40 g/10 min.

10. The cable of claim 1, wherein the polymer composition of the insulation layer has a conductivity of 1.5 fS/m or less when measured according to DC conductivity method as described under "Determination Method A".

11. The cable of claim 1, wherein the polymer composition of the insulation layer has a conductivity of $3.5 \times 10^{-17}$ S/cm or less when measured according to DC conductivity method as described under "Determination Methods B".

12. The cable of claim 1, wherein the polymer composition comprises 1.0 to 3.0 wt % HDPE.

13. The cable of claim 1, wherein the insulation layer is crosslinked and the HDPE is unimodal.

14. The cable of claim 1, wherein the HDPE is a single site produced HDPE.

15. The cable of claim 1, wherein the insulation layer comprises 99 wt % or more of the polymer composition.

16. A process for producing a cable comprising:
applying on one or more conductors, an inner semiconductive layer, an insulation layer and an outer semiconductive layer, in that order, wherein the insulation layer comprises at least 90 wt % of a polymer composition as defined in claim 1 and is optionally cross-linked.

17. A cable comprising one or more conductors surrounded by at least an inner semiconductive layer, an insulation layer and an outer semiconductive layer, in that order, wherein the insulation layer is not cross-linked and comprises at least 90 wt % of a polymer composition, said polymer composition comprising:
(I) 95.5 to 99.9 wt % of an LDPE; and
(II) 0.1 to 4.5 wt % of a multimodal HDPE having a density of at least 940 kg/m$^3$.

* * * * *